United States Patent
Liu et al.

(10) Patent No.: US 8,462,602 B2
(45) Date of Patent: Jun. 11, 2013

(54) DATA RECOVERY DEVICE AND METHOD

(75) Inventors: Shih-Hsien Liu, Hsinchu (TW); Zhieng-Chung Chen, Changhua County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 321 days.

(21) Appl. No.: 13/040,272

(22) Filed: Mar. 4, 2011

(65) Prior Publication Data

US 2012/0075976 A1 Mar. 29, 2012

(30) Foreign Application Priority Data

Sep. 27, 2010 (TW) .................................. 99132633 A

(51) Int. Cl.
*G11B 5/09* (2006.01)
*G11B 20/10* (2006.01)
*G11B 27/36* (2006.01)
*G11B 15/52* (2006.01)

(52) U.S. Cl.
USPC .................. 369/59.15; 369/59.21; 369/59.19; 369/47.35; 369/44.34; 369/47.19; 369/59.22

(58) Field of Classification Search
USPC .......... 369/59.15, 59.21, 59.19, 47.35, 44.34, 369/47.19, 59.22
See application file for complete search history.

(56) References Cited

U.S. PATENT DOCUMENTS

| 6,418,101 B1 * | 7/2002 | Finkelstein | 369/47.18 |
| 2006/0274620 A1 * | 12/2006 | Haddad | 369/53.31 |

* cited by examiner

*Primary Examiner* — Aneeta Yodichkas
(74) *Attorney, Agent, or Firm* — Jianq Chyun IP Office

(57) ABSTRACT

A data recovery device including an analog to digital converter (ADC), a filtering-equalizing unit, a zero crossing detector, a data phase locked loop, a data mapping unit and an estimation unit is provided. The ADC converts a radio frequency signal to a plurality of sampling data points. The sampling data points are converted to a plurality of retiming data points and a clock signal by the filtering-equalizing unit, the zero crossing detector and the data phase locked loop. The data mapping unit selects a plurality of maximum data points and minimum data points from the returning data points, and determines whether to map the maximum data points and the minimum data points to other levels for partially reconstructing the retiming data points. The estimation unit recovers the reconstructed retiming data points to a modulation signal.

15 Claims, 4 Drawing Sheets

DATA RECOVERY DEVICE AND METHOD

CROSS-REFERENCE TO RELATED APPLICATION

This application claims the priority benefit of Taiwan application serial no. 99132633, filed Sep. 27, 2010. The entirety of the above-mentioned patent application is hereby incorporated by reference herein and made a part of this specification.

BACKGROUND

1. Field of the Invention

The invention relates to a data recovery device and method. Particularly, the invention relates to a data recovery device and method for an optical storage system.

2. Description of Related Art

When an optical storage system reads a radio frequency (RF) signal, it is liable to be influenced by factors such as inter-symbol interference (ISI), electrical delay, aging of dyes on a disc, or scratching surface of the disc to cause a poor recognition, so that a recognition degree of the RF signal is influenced. To avoid the above problem, the RF signal read by an optical pickup head has to be processed by a data recovery device, so that the system can obtain a modulation signal and a clock signal representing the original data.

Generally, most of the existing data recovery devices first convert the RF signals into digital sampling data points, and then compensate the RF signal with an excessively short period length by increasing gain values of the sampling data points. For example, in the existing data recovery device, the RF signal with an excessively short period length is amplified, and the RF signal with a relatively long period length is almost maintained to it original magnitude. Then, the existing data recovery device fetches retiming data points with reference of compensated sampling data points, and recovers the retiming data points to a modulation signal.

However, when the RF signal compressed (or burned) on the disc is abnormal due to wearing of a mold or unevenness of a burn power, a common phenomenon thereof is as that shown in FIG. 1, and in FIG. 1, a dotted line represents sampling data points obtained after the RF signal is sampled, and circles represent the returning data points. Referring to a retiming data stream RTO11 at an upper portion of FIG. 1, a signal with a period length of 3T is generally amplified, so that the system recovers the retiming data stream RTO11 to signals of 4T, 3T and 4T, wherein T refers to a time interval of one channel bit. However, when the compensated 3T signal is still excessively small, as that shown by a retiming data stream RTO2 at a lower portion of FIG. 1, a minimum point of the 3T signal cannot be lower than a reference level. Therefore, the system misjudges the retiming data stream RTO12 as a signal of 11T (4T+3T+4T).

In other words, regarding the abnormal RF signal (for example, the RF signal with an excessively short period length), the existing recovery device can only compensate the RF signal by increasing the gain value. However, when the gain value is not great enough, the optical storage system still cannot obtain the original data. Moreover, the greater the gain value is, the more obvious the RF signal with a relatively long period length is influenced, so that the normal RF signal can be influenced.

SUMMARY OF THE INVENTION

The invention is directed to a data recovery device, in which a data mapping unit is used to individually compensate an abnormal radio frequency (RF) signal, so as to improve a recognition degree of the RF signal.

The invention is directed to a data recovery method, by which an abnormal RF signal is compensated without influencing normal RF signals.

The invention provides a data recovery device, which is used for recovering a RF signal in an optical storage system to a clock signal and a modulation signal. The data recovery device includes an analog to digital converter (ADC), a filtering-equalizing unit, a zero crossing detector, a data phase locked loop, a data mapping unit and an estimation unit. The ADC converts the RF signal into a plurality of sampling data points. The filtering-equalizing unit compensates gain values of the sampling data points, and filters noises of the sampling data points. The zero crossing detector separates numbers of the sampling data points above and below a comparison level. The data phase locked loop obtains a plurality of retiming data points among the sampling data points and the clock signal.

Moreover, the data mapping unit selects a plurality of regional maximum data points and minimum data points from the retiming data points, and determines whether or not to respectively map the maximum data points and the minimum data points to a first level and a second level for partially reconstructing the retiming data points. The estimation unit recovers the reconstructed retiming data points to the modulation signal according to a partial response maximum likelihood method.

In an embodiment of the invention, the data mapping unit selects the retiming data points one-by-one to serve as a specific data point, and compares the specific data point with N retiming data points before and behind the specific data point in the retiming data points, wherein N is a positive integer. Moreover, when the specific data point is respectively greater than the N retiming data points before and behind the specific data point, the data mapping unit determines the specific data point to be one of the maximum data points, and when the specific data point is respectively smaller than the N retiming data points before and behind the specific data point, the data mapping unit determines the specific data point to be one of the minimum data points.

According to another aspect, the invention provides a data recovery method, which is used for recovering a RF signal in an optical storage system to a clock signal and a modulation signal. The data recovery method can be described as follows. In the beginning, the RF signal is converted into a plurality of sampling data points. Then, gain values of the sampling data points are compensated, and noises of the sampling data points are filtered. Moreover, numbers of the sampling data points above and below a comparison level are separated, and a plurality of retiming data points among the sampling data points and the clock signal are obtained. In order to individually compensate an abnormal signal, a plurality of regional maximum data points and minimum data points are selected from the retiming data points, and it is determined whether or not to respectively map the maximum data points and the minimum data points to a first level and a second level for partially reconstructing the retiming data points. The first level and the second level are respectively greater than and smaller than a reference level. Then, the reconstructed retiming data points are recovered to the modulation signal according to a partial response maximum likelihood method.

According to the above descriptions, in the invention, the filtering-equalizing unit is first used to compensate the gain values of the sampling data points, and then the data mapping unit is used to individually compensate the signals still having excessively small gain values. In this way, not only the abnormal RF signal (for example, the RF signal with an excessively short period length) can be individually compensated, but also the normal RF signals are not influenced. Therefore, the recognition degree of the RF signal can be improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
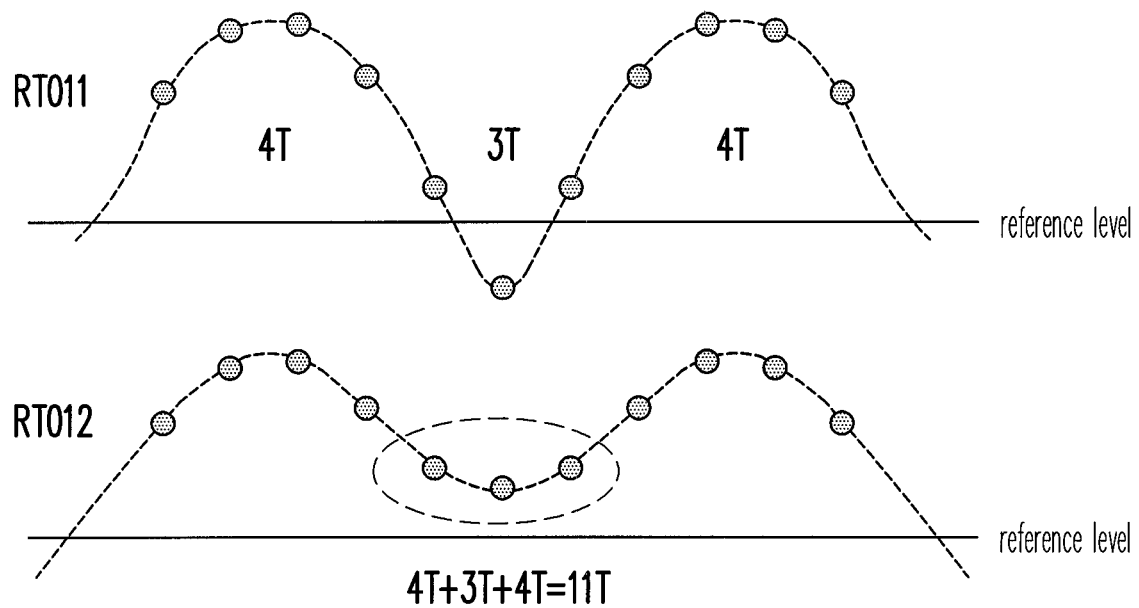
FIG. 1 is a timing diagram illustrating variation of data points when a radio frequency (RF) signal is normal and abnormal.
Figure 2:
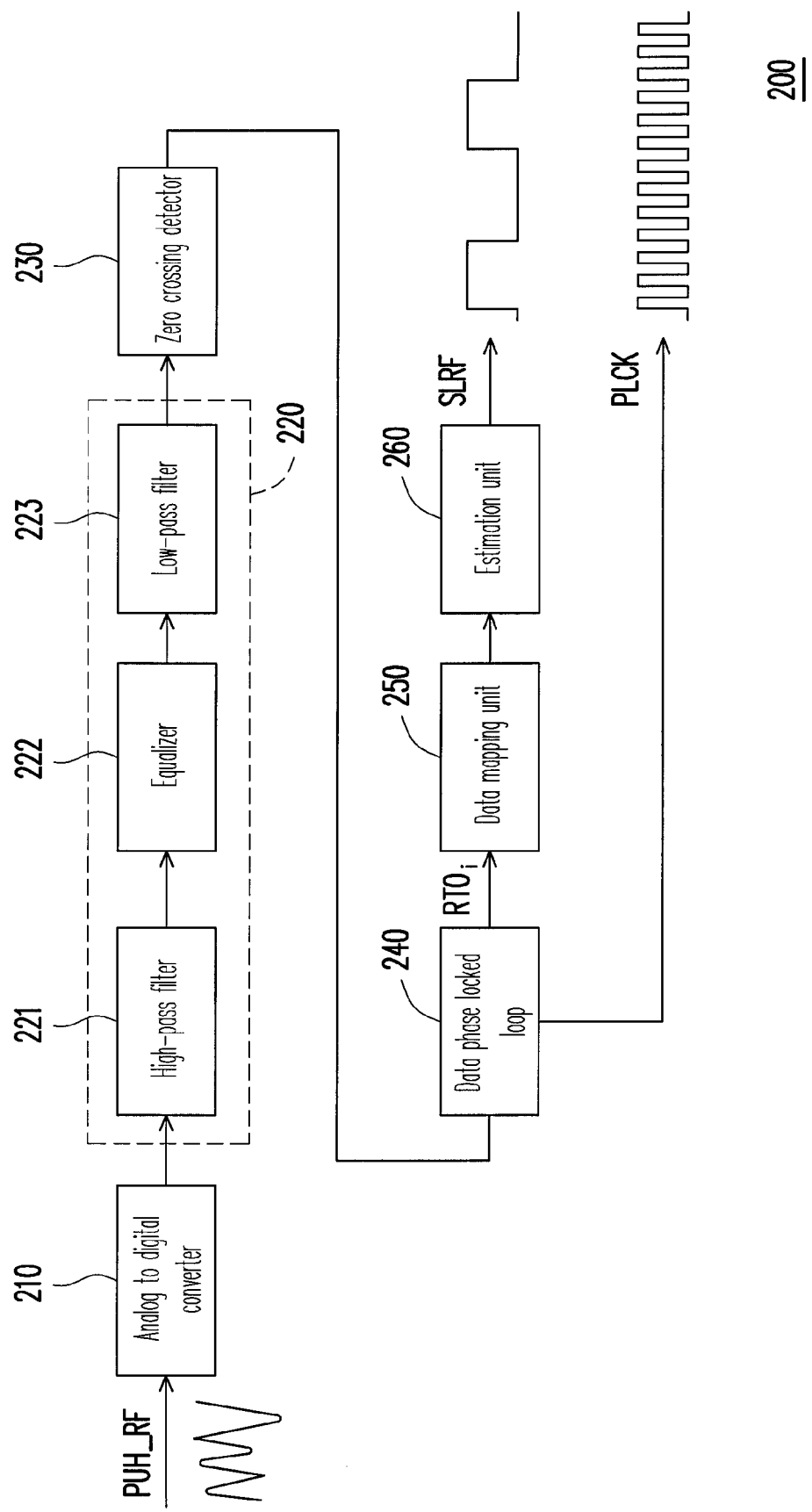
FIG. 2 is a block schematic diagram illustrating a data recovery device according to an embodiment of the invention.

FIG. 2 is a block schematic diagram illustrating a data recovery device according to an embodiment of the invention. Referring to FIG. 2, the data recovery device 200 is used for recovering a radio frequency (RF) signal PUH_RF in an optical storage system to a clock signal PLCK and a modulation signal SLRF. In the present embodiment, the data recovery device 200 includes an analog to digital converter (ADC) 210, a filtering-equalizing unit 220, a zero crossing detector 230, a data phase locked loop 240, a data mapping unit 250 and an estimation unit 260. The filtering-equalizing unit 220 is coupled to the ADC 210. The zero crossing detector 230 is coupled to the filtering-equalizing unit 220. The data phase locked loop 240 is coupled to the zero crossing detector 230. The data mapping unit 250 is coupled to the data phase locked loop 240. The estimation unit 260 is coupled to the data mapping unit 250.

In view of a whole operation, the ADC 210 converts the RF signal PUH_RF into a plurality of digital sampling data points. Then, the filtering-equalizing unit 220 compensates gain values of the sampling data points, and filters noises of the sampling data points. For example, in the present embodiment, the filtering-equalizing unit 220 includes a high-pass filter 221, an equalizer 222 and a low-pass filter 223. The high-pass filter 221 filters low-frequency components of the sampling data points. The equalizer 222 compensates the gain values of the sampling data points, and the low-pass filter 223 filters high-frequency components of the sampling data points. In this way, the filtering-equalizing unit 220 can suitably compensate the gain value of the signal with an excessively short period length, and maintain almost an original magnitude of the signal with a relatively long period length.

Then, the zero crossing detector 230 separates numbers of the sampling data points above and below a comparison level, so as to equalize the number of the sampling data points above the comparison level and the number of the sampling data points below the comparison level. A function of the zero crossing detector 230 is similar to that of a data slicer. Moreover, the sampling data points processed by the zero crossing detector 230 are transmitted to the data phase locked loop 240 to obtain a plurality of retiming data points $RTO_i$ among the sampling data points and the clock signal PLCK.

Since the gain values compensated by the filtering-equalizing unit 220 can be excessively small, which causes that the system cannot obtain the original data, the data mapping unit 250 selects a plurality of regional maximum data points and minimum data points from the plurality of retiming data points $RTO_i$, and determines whether or not to respectively map the maximum data points and the minimum data points to a first level and a second level. In this way, the data mapping unit 250 can reconstruct a part of the retiming data points that still have excessively small gain values after being processed by the filtering-equalizing unit 220. The retiming data points processed by the data mapping unit 250 are transmitted to the estimation unit 260 for recovering to the modulation signal SLRF according to a partial response maximum likelihood method.

Figure 3:
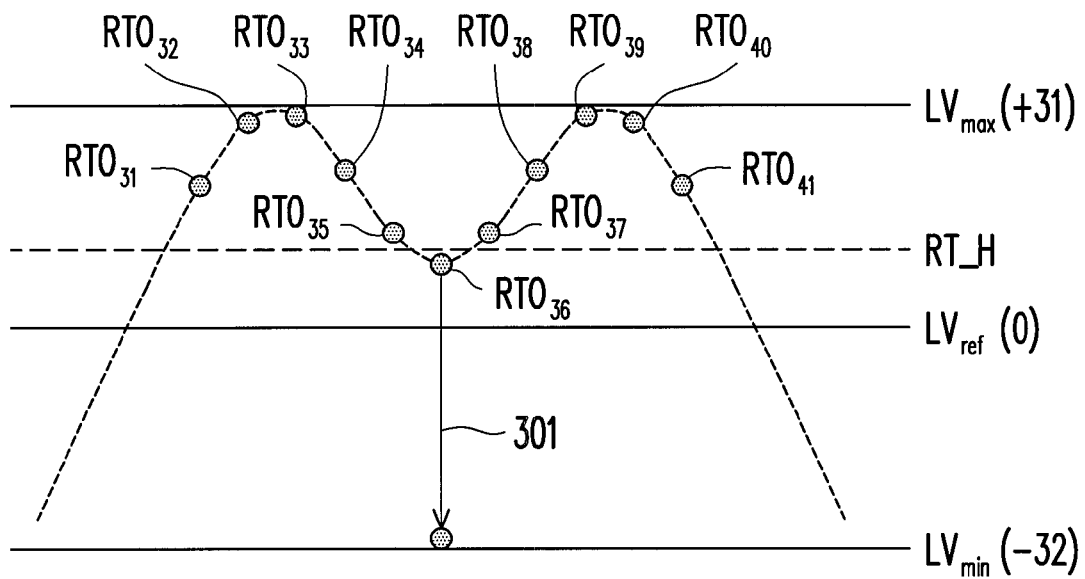
FIG. 3 is a signal timing diagram according to an embodiment of the invention.

For example, FIG. 3 is a signal timing diagram according to an embodiment of the invention, in which a dotted line represents the sampling data points of the RF signal sampled by the ADC 210, and circles represent the retiming data points obtained by the data phase locked loop 240. For simplicity's sake, the retiming data points are marked by $RTO_{31}$-$RTO_{41}$ in FIG. 3. Moreover, in the embodiment of FIG. 3, operation of effective number of 6-bit is taken an example, so that a range of value operations of the data points is −32-+31. Namely, in the embodiment of FIG. 3, a maximum level $LV_{max}$ of the data points in value operations of is +31, a minimum level $LV_{min}$ thereof is −32, and a reference level $LV_{ref}$ is 0.

Referring to the signal timing diagram of FIG. 3, the data mapping unit 250 selects the retiming data points $RTO_{33}$ and $RTO_{39}$ from the retiming data points $RTO_{31}$-$RTO_{41}$ to serve as regional maximum data points, and selects the retiming data point $RTO_{36}$ to serve as a regional minimum data point. A method for the data mapping unit 250 selecting the regional minimum data point is to compare a retiming data point $RTO_j$ with N retiming data points $RTO_{j-N}$, . . . , $RTO_{j-1}$, $RTO_{j+1}$, . . . , $RTO_{j+N}$ before and behind the retiming data point $RTO_j$, and regards the retiming data point $RTO_j$ as the regional minimum data point when the retiming data point $RTO_j$ is smaller than the retiming data points $RTO_{j-N}$, . . . , $RTO_{j-1}$, $RTO_{j+1}$, . . . , $RTO_{j+N}$ respectively, wherein N is a positive integer. Moreover, in an exemplary embodiment, N is a positive integer of 1, 2, or 3.

Taking the retiming data point $RTO_{36}$ (j=36) and N=2 as an example, the data mapping unit 250 compares the retiming data point $RTO_{36}$ with the retiming data points $RTO_{34}$, $RTO_{35}$, $RTO_{37}$, and $RTO_{38}$, respectively. Moreover, when the retiming data point $RTO_{36}$ is smaller than the retiming data points $RTO_{34}$, $RTO_{35}$, $RTO_{37}$, and $RTO_{38}$, respectively, the data mapping unit 250 regards the retiming data point $RTO_{36}$ as the regional minimum data point.

Regarding the regional minimum data point $RTO_{36}$ and the adjacent retiming data points $RTO_{35}$ and $RTO_{37}$, the data mapping unit 250 determines whether the minimum data point $RTO_{36}$ is lower than a high threshold level RT_H, and determines whether the two adjacent retiming data points $RTO_{35}$ and $RTO_{37}$ are higher than the reference level $LV_{ref}$, wherein the high threshold level RT_H is greater than the reference level $LV_{ref}$. When the minimum data point $RTO_{36}$ is lower than the high threshold level RT_H, and the two adjacent retiming data points $RTO_{35}$ and $RTO_{37}$ are higher than the reference level $LV_{ref}$, it represents that the gain value compensated by the filtering-equalizing unit 220 is not great enough. Therefore, shown by an arrow 301 of FIG. 3, the data mapping unit 250 maps the minimum data point $RTO_{36}$ to the second level, wherein the second level is smaller than the reference level $LV_{ref}$, and in the embodiment of FIG. 3, the second level is the minimum level $LV_{min}(-32)$ of the data points in value operations. Conversely, when the minimum data point $RTO_{36}$ is not lower than the high threshold level RT_H, or the two adjacent retiming data points $RTO_{35}$ and $RTO_{37}$ are lower than the reference level $LV_{ref}$, the data mapping unit 250 does not change the minimum data point $RTO_{36}$.

Figure 4:
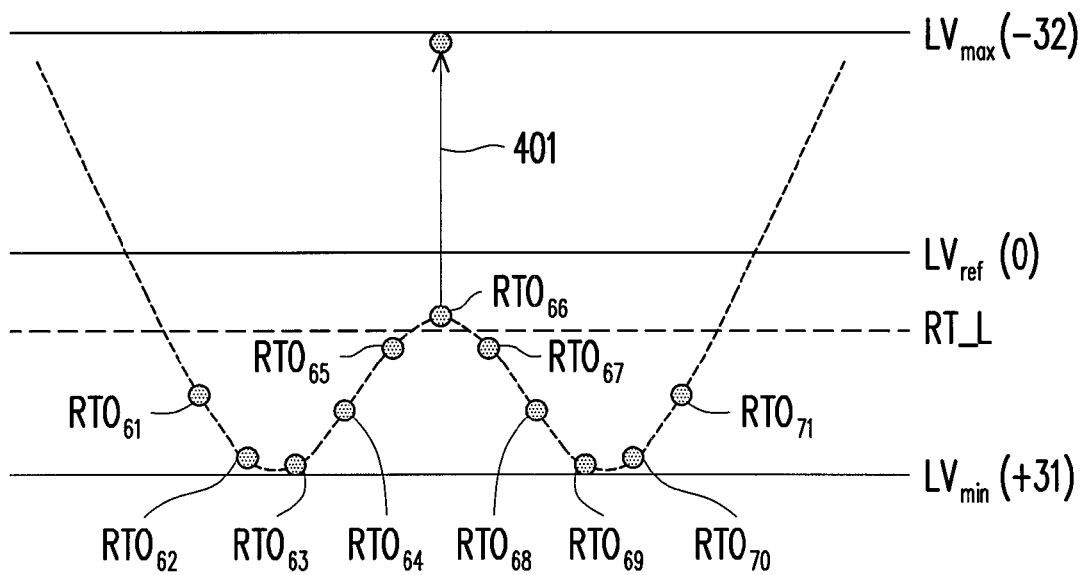
FIG. 4 is a signal timing diagram according to another embodiment of the invention.

Further, FIG. 4 is a signal timing diagram according to another embodiment of the invention, in which a dotted line represents the sampling data points of the RF signal sampled by the ADC 210, and circles represent the retiming data points obtained by the data phase locked loop 240. For simplicity's sake, the retiming data points are marked by $RTO_{61}$-$RTO_{71}$ in FIG. 4. Moreover, similar to the embodiment of FIG. 3, in the embodiment of FIG. 4, operation of effective number of 6-bit is taken an example, so that a range of value operations of the data points is −32-+31.

Referring to the signal timing diagram of FIG. 4, the data mapping unit 250 selects the retiming data points $RTO_{63}$ and $RTO_{69}$ from the retiming data points $RTO_{61}$-$RTO_{71}$ to serve as the regional minimum data points, and selects the retiming data point $RTO_{66}$ to serve as the regional maximum data point. A method for the data mapping unit 250 selecting the regional maximum data point is to compare a retiming data point $RTO_j$ with N retiming data points $RTO_{j-N}, \ldots, RTO_{j-1}$, $RTO_{j+1}, \ldots, RTO_{j+N}$ before and behind the retiming data point $RTO_j$, and regards the retiming data point $RTO_j$ as the regional maximum data point when the retiming data point $RTO_j$ is greater than the retiming data points $RTO_{j-N}, \ldots$, $RTO_{j-1}, RTO_{j+1}, \ldots, RTO_{j+N}$ respectively, wherein N is a positive integer. Moreover, in an exemplary embodiment, N is a positive integer smaller than or equal to 3.

Taking the retiming data point $RTO_{66}$ (j=66) and N=2 as an example, the data mapping unit 250 compares the retiming data point $RTO_{66}$ with the retiming data points $RTO_{64}$, $RTO_{65}, RTO_{67}$, and $RTO_{68}$, respectively. Moreover, when the retiming data point $RTO_{66}$ is greater than the retiming data points $RTO_{64}, RTO_{65}, RTO_{67}$, and $RTO_{68}$, respectively, the data mapping unit 250 regards the retiming data point $RTO_{66}$ as the regional maximum data point.

Regarding the regional maximum data point $RTO_{66}$ and the adjacent retiming data points $RTO_{65}$ and $RTO_{67}$, the data mapping unit 250 determines whether the maximum data point $RTO_{66}$ is higher than a low threshold level RT_L, and determines whether the two adjacent retiming data points $RTO_{65}$ and $RTO_{67}$ are lower than the reference level $LV_{ref}$, wherein the low threshold level RT_L is smaller than the reference level $LV_{ref}$. When the maximum data point $RTO_{66}$ is higher than the low threshold level RT_L, and the two adjacent retiming data points $RTO_{65}$ and $RTO_{67}$ are lower than the reference level $LV_{ref}$, it represents that the gain value compensated by the filtering-equalizing unit 220 is not great enough. Therefore, shown by an arrow 401 of FIG. 4, the data mapping unit 250 maps the maximum data point $RTO_{66}$ to the first level, wherein the first level is greater than the reference level $LV_{ref}$, and in the embodiment of FIG. 4, the first level is the maximum level $LV_{max}(+31)$ of the data points in value operations. Conversely, when the maximum data point $RTO_{66}$ is not higher than the low threshold level RT_L, or the two adjacent retiming data points $RTO_{65}$ and $RTO_{67}$ are higher than the reference level $LV_{ref}$, the data mapping unit 250 does not change the maximum data point $RTO_{66}$.

Figure 5:
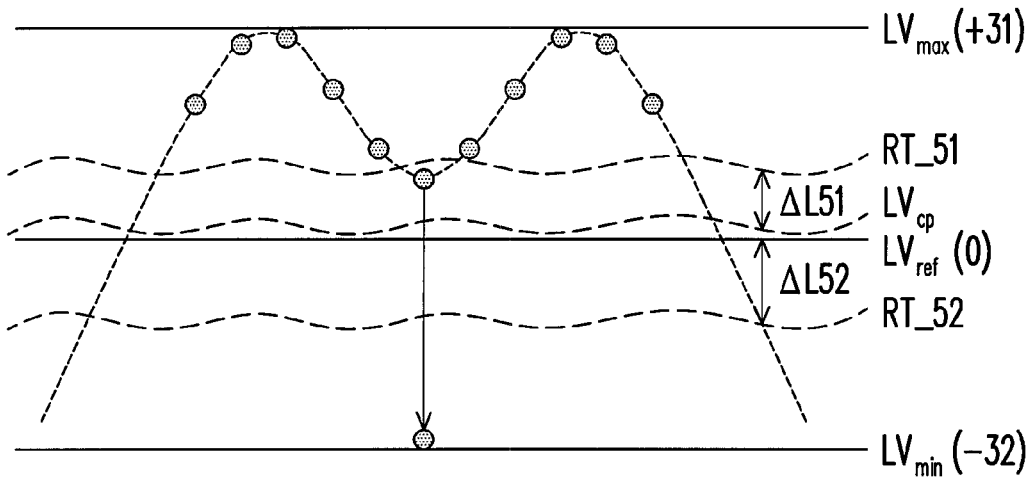
FIG. 5 is a signal timing diagram according to still another embodiment of the invention.

It should be noticed that in the signal timing diagrams of FIG. 3 and FIG. 4, the low threshold level RT_L and the high threshold level RT_H are not varied along with time (fixed levels). However, in an actual application, the threshold levels used for determining the maximum data points and the minimum data points can also be varied along with time. For example, FIG. 5 is a signal timing diagram according to still another embodiment of the invention, in which a dotted line represents the sampling data points of the sampled RF signal, and circles represent the obtained retiming data points. As shown in FIG. 5, a high threshold level RT_51 and a low threshold level RT_52 used for determining the maximum data points and the minimum data points are respectively defined according to a varied comparison level $LV_{cp}$. Here, the low threshold level RT_52 is equal to the comparison level $LV_{cp}$ shifting downwards by a first predetermined value ΔL52. The high threshold level RT_51 is equal to the comparison level $LV_{cp}$ shifting upwards by a second predetermined value ΔL51.

Figure 6:
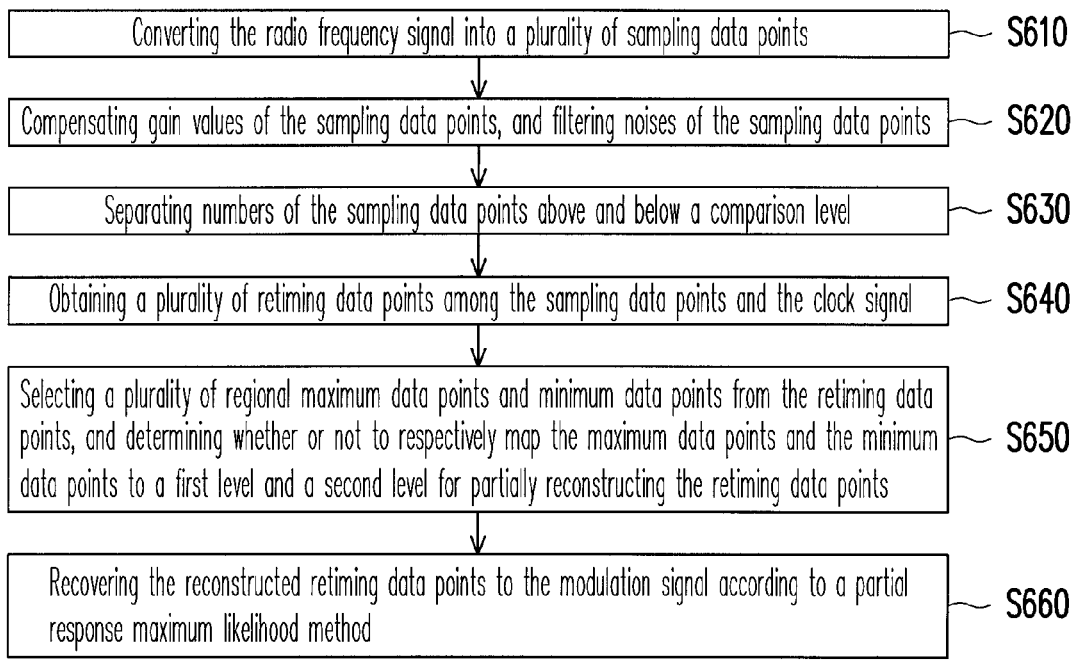
FIG. 6 is a flowchart illustrating a data recovery method according to an embodiment of the invention.

According to another aspect, FIG. 6 is a flowchart illustrating a data recovery method according to an embodiment of the invention. The data recovery method is used for recovering a RF signal in an optical storage system to a clock signal and a modulation signal. Referring to FIG. 6, in step S610, in the beginning, the RF signal is converted into a plurality of sampling data points. Then, in step S620, gain values of the sampling data points are compensated, and noises of the sampling data points are filtered. In this way, the signal with an excessively short period length is amplified, and the signal with a relatively long period length is almost maintained to its original magnitude.

Moreover, in step S630, numbers of the sampling data points above and below a comparison level are separated, so as to equalize the number of the sampling data points above the comparison level and the number of the sampling data points below the comparison level. Moreover, in step S640, a plurality of retiming data points among the sampling data points and the clock signal are obtained. It should be noticed that in order to avoid excessively small compensated gain values to cause that the system cannot decode the signal with an excessively short period length, in step S650, a plurality of regional maximum data points and minimum data points are selected from the retiming data points, and it is determined whether or not to respectively map the maximum data points and the minimum data points to a first level and a second level for partially reconstructing the retiming data points. The first level is greater than the reference level, and the second level is smaller than the reference level. Finally, in step S660, the reconstructed retiming data points are recovered to the modulation signal according to a partial response maximum likelihood method.

In summary, in the invention, the filtering-equalizing unit is used to compensate the gain values of the sampling data points. Moreover, in order to avoid the system cannot decode the signal with an excessively short period length due to the insufficient gain values, the data mapping unit is used to determine whether or not to map the maximum data points and the minimum data points to other levels. In this way, not only the abnormal RF signal (for example, the RF signal with an excessively short period length) can be individually compensated, but also the normal RF signals are not influenced. Therefore, the recognition degree of the RF signal can be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data recovery device, used for recovering a radio frequency signal in an optical storage system to a clock signal and a modulation signal, the data recovery device comprising:
    an analog to digital converter, for converting the radio frequency signal into a plurality of sampling data points;
    a filtering-equalizing unit, for compensating gain values of the sampling data points, and filtering noises of the sampling data points;
    a zero crossing detector, separating numbers of the sampling data points above and below a comparison level;
    a data phase locked loop, for obtaining a plurality of retiming data points among the sampling data points and the clock signal;
    a data mapping unit, for selecting a plurality of regional maximum data points and minimum data points from the retiming data points, and determining whether or not to respectively map the maximum data points and the minimum data points to a first level and a second level for partially reconstructing the retiming data points, wherein the first level and the second level are respectively greater than and less than a reference level; and
    an estimation unit, for recovering the reconstructed retiming data points to the modulation signal according to a partial response maximum likelihood method.

2. The data recovery device as claimed in claim 1, wherein the filtering-equalizing unit comprises:
    a high-pass filter, for filtering low-frequency components of the sampling data points;
    an equalizer, for compensating the gain values of the sampling data points; and
    a low-pass filter, for filtering high-frequency components of the sampling data points.

3. The data recovery device as claimed in claim 1, wherein the data mapping unit selects the retiming data points one-by-one to serve as a specific data point, and compares the specific data point with N retiming data points before and behind the specific data point in the retiming data points, wherein N is a positive integer, and when the specific data point is respectively greater than the N retiming data points before and behind the specific data point, the data mapping unit determines the specific data point to be one of the maximum data points, and when the specific data point is respectively smaller than the N retiming data points before and behind the specific data point, the data mapping unit determines the specific data point to be one of the minimum data points.

4. The data recovery device as claimed in claim 3, wherein N is a positive integer of 1, 2 or 3.

5. The data recovery device as claimed in claim 1, wherein the data mapping unit selects the maximum data points one-by-one, and determines whether the selected maximum data point is higher than a low threshold level, and determines whether two retiming data points adjacent to the selected maximum data point are lower than the reference level, wherein the low threshold level is smaller than the reference level, and when the selected maximum data point is higher than the low threshold level, and the two retiming data points adjacent to the selected maximum data point are lower than the reference level, the data mapping unit maps the selected maximum data point to the first level, and when the selected maximum data point is not higher than the low threshold level, or the two retiming data points adjacent to the selected maximum data point are higher than the reference level, the data mapping unit does not map the selected maximum data point to the first level.

6. The data recovery device as claimed in claim 5, wherein the low threshold level is equal to the comparison level shifting downwards by a first predetermined value.

7. The data recovery device as claimed in claim 1, wherein the data mapping unit selects the minimum data points one-by-one, and determines whether the selected minimum data point is lower than a high threshold level, and determines whether two retiming data points adjacent to the selected minimum data point are higher than the reference level, wherein the high threshold level is greater than the reference level, and when the selected minimum data point is lower than the high threshold level, and the two retiming data points adjacent to the selected minimum data point are higher than the reference level, the data mapping unit maps the selected minimum data point to the second level, and when the selected minimum data point is not lower than the high threshold level, or the two retiming data points adjacent to the selected minimum data point are lower than the reference level, the data mapping unit does not map the selected minimum data point to the second level.

8. The data recovery device as claimed in claim 7, wherein the high threshold level is equal to the comparison level shifting upwards by a second predetermined value.

9. A data recovery method, for recovering a radio frequency signal in an optical storage system to a clock signal and a modulation signal, the data recovery method comprising:
    converting the radio frequency signal into a plurality of sampling data points;
    compensating gain values of the sampling data points, and filtering noises of the sampling data points;
    separating numbers of the sampling data points above and below a comparison level;
    obtaining a plurality of retiming data points among the sampling data points and the clock signal;
    selecting a plurality of regional maximum data points and minimum data points from the retiming data points, and determining whether or not to respectively map the maximum data points and the minimum data points to a first level and a second level for partially reconstructing the retiming data points, wherein the first level and the second level are respectively greater than and less than a reference level; and
    recovering the reconstructed retiming data points to the modulation signal according to a partial response maximum likelihood method.

10. The data recovery method as claimed in claim 9, wherein the step of selecting the regional maximum data points and the minimum data points from the retiming data points comprises:
    selecting one of the retiming data points to serve as a specific data point;
    comparing the specific data point with N retiming data points before and behind the specific data point in the retiming data points, wherein N is a positive integer;
    determining the specific data point to be one of the maximum data points when the specific data point is respectively greater than the N retiming data points before and behind the specific data point;
    determining the specific data point to be one of the minimum data points when the specific data point is respectively smaller than the N retiming data points before and behind the specific data point; and reselecting the specific data point until the retiming data points are one-by-one selected as the specific data point.

11. The data recovery method as claimed in claim 10, wherein N is a positive integer of 1, 2 or 3.

12. The data recovery method as claimed in claim 9, wherein the step of determining whether or not to map the maximum data points to the first level comprises:
    selecting the maximum data points;
    one-by-one determining whether the selected maximum data point is higher than a low threshold level, and determining whether two retiming data points adjacent to the selected maximum data point are lower than the reference level;
    mapping the selected maximum data point to the first level when the selected maximum data point is higher than the low threshold level, and the two retiming data points adjacent to the selected maximum data point are lower than the reference level; and
    un-mapping the selected maximum data point to the first level when the selected maximum data point is not higher than the low threshold level, or the two retiming data points adjacent to the selected maximum data point are higher than the reference level.

13. The data recovery method as claimed in claim 12, wherein the low threshold level is equal to the comparison level shifting downwards by a first predetermined value.

14. The data recovery method as claimed in claim 9, wherein the step of determining whether or not to map the minimum data points to the second level comprises:
    selecting the minimum data points one-by-one;
    determining whether the selected minimum data point is lower than a high threshold level, and determining whether two retiming data points adjacent to the selected minimum data point are higher than the reference level;
    mapping the selected minimum data point to the second level when the selected minimum data point is lower than the high threshold level, and the two retiming data points adjacent to the selected minimum data point are higher than the reference level; and
    un-mapping the selected minimum data point to the second level when the selected minimum data point is not lower than the high threshold level, or the two retiming data points adjacent to the selected minimum data point are lower than the reference level.

15. The data recovery method as claimed in claim 14, wherein the high threshold level is equal to the comparison level shifting upwards by a second predetermined value.

* * * * *